United States Patent
Yoshida et al.

(10) Patent No.: US 8,836,744 B2
(45) Date of Patent: Sep. 16, 2014

(54) OPTICAL SCANNER DEVICE AND IMAGE FORMING APPARATUS WITH SCANNING LENS THAT CAN BE MACHINED EASILY

(71) Applicant: KYOCERA Document Solutions Inc., Osaka (JP)

(72) Inventors: Shingo Yoshida, Osaka (JP); Hideki Okamura, Osaka (JP); Issei Nakano, Osaka (JP)

(73) Assignee: KYOCERA Document Solutions, Inc. (JP)

( * ) Notice: Subject to any disclaimer, the term of this patent is extended or adjusted under 35 U.S.C. 154(b) by 0 days.

(21) Appl. No.: 13/772,413

(22) Filed: Feb. 21, 2013

(65) Prior Publication Data

US 2013/0222506 A1    Aug. 29, 2013

(30) Foreign Application Priority Data

Feb. 27, 2012  (JP) ................. 2012-040221

(51) Int. Cl.
| | |
|---|---|
| *B41J 15/14* | (2006.01) |
| *B41J 27/00* | (2006.01) |
| *G02B 13/00* | (2006.01) |
| *G02B 26/12* | (2006.01) |
| *G02B 26/10* | (2006.01) |
| *G03G 15/04* | (2006.01) |
| *B41J 2/47* | (2006.01) |

(52) U.S. Cl.
CPC ............ *G02B 26/10* (2013.01); *G02B 13/0005* (2013.01); *G02B 26/125* (2013.01); *G03G 15/04036* (2013.01); *B41J 2/473* (2013.01); *G02B 26/101* (2013.01)
USPC .......................................... 347/244; 347/258

(58) Field of Classification Search
USPC ................. 347/230–233, 241–244, 256–261
See application file for complete search history.

(56) References Cited

U.S. PATENT DOCUMENTS

| | | | |
|---|---|---|---|
| 7,898,711 B2 * | 3/2011 | Kato | .......................... 359/207.5 |
| 2006/0001938 A1 | 1/2006 | Kim | |
| 2008/0158331 A1 | 7/2008 | Kato | |
| 2010/0141730 A1 | 6/2010 | Kato | |
| 2011/0116148 A1 | 5/2011 | Kato | |
| 2011/0216151 A1 | 9/2011 | Kato | |
| 2011/0216152 A1 | 9/2011 | Kato | |

FOREIGN PATENT DOCUMENTS

JP         3706858         8/2005

* cited by examiner

*Primary Examiner* — Hai C Pham
(74) *Attorney, Agent, or Firm* — Gerald E. Hespos; Michael J. Porco; Matthew T. Hespos (57) ABSTRACT

An optical scanning device includes a light source, a deflector, an incident optical system and one scanning lens. The scanning lens includes a first face and a second face. In a main scanning direction cross section of the scanning lens, when a scanning range is separated, with on axis as a reference, into an image height region of a first direction and an image height region of a second direction that is opposite to the first direction, the incident optical system is disposed on a side of the image height region of the first direction. Curvature of the first face in a sub scanning direction cross section decreases from on axis toward off axis in the main scanning direction, and curvature of the second face in the sub scanning direction cross section increases from off axis of the first direction toward the second direction in the main scanning direction.

8 Claims, 12 Drawing Sheets

FIG. 10A
ON-AXIS

FIG. 10B
OFF-AXIS

OPTICAL SCANNER DEVICE AND IMAGE FORMING APPARATUS WITH SCANNING LENS THAT CAN BE MACHINED EASILY

This application relates to and claims priority from Japanese Patent Application No. 2012-40221, filed on Feb. 27, 2012 with the Japan Patent Office, the entire disclosure of which is incorporated herein by reference.

BACKGROUND

The present disclosure relates to an optical scanning device including a scanning lens which performs, on a surface to be scanned, imaging of a light beam that was deflected and scanned, and an image forming apparatus using the foregoing optical scanning device.

For example, a general optical scanning device that is used, for example, in laser printers and copiers includes a light source which emits a laser beam, a polygon mirror which reflects and deflects/scans the laser beam, and a scanning lens which performs imaging of the laser beam deflected for scanning on a peripheral surface (surface to be scanned) of a photoreceptor drum. As the scanning lens, a lens having a distortion (fθ characteristics) in which the angle of the incident light and the height of the image become a proportional relation is used. Moreover, the foregoing scanning lens is generally manufactured by molding a resin material in a metal mold.

One of the optical properties that are demanded in this kind of optical scanning device is that the field curvature is favorably corrected and the spot diameter of the beam generated by the laser beam is aligned across the entire image height. As conventional technology, known is technology which inhibits changes in the spot diameter by causing the curvature of the scanning lens in the sub scanning direction to continuously change from on axis toward off axis, and inverting the symbol of the curvature from on axis toward off axis. For example, a lens that has a meniscus shape on axis and a shape in which both surfaces are convex off axis is used as the scanning lens.

Nevertheless, the scanning lens of the foregoing conventional technology has a problem in that it is difficult to produce. In other words, upon processing the mold of the foregoing scanning lens, it is necessary to create a shape that will invert the symbol of the curvature in the sub scanning direction from on axis toward off axis. With this kind of inverted part of the curvature symbol, a discontinuous section tends to arise on the mold surface. Accordingly, a great difficulty is encountered in the die machining.

An object of the present disclosure is to provide an optical scanning device including a scanning lens in which the die machining thereof is easy and which yields superior optical performance, as well as an image forming apparatus using such an optical scanning device.

SUMMARY

The optical scanning device according to one aspect of the present disclosure includes a light source which emits a light beam, a deflector, an incident optical system and one scanning lens. The deflector includes a deflective surface which reflects and then deflects/scans the light beam emitted from the light source. The incident optical system causes the light beam emitted from the light source to enter the deflector from an oblique direction. The scanning lens includes a first face facing the deflector and a second face on an opposite side to the first face, and performs imaging of the light beam deflected/scanned on a surface to be scanned. In a main scanning direction cross section of the scanning lens, when a scanning range is separated, with on axis as a reference, into an image height region of a first direction and an image height region of a second direction that is opposite to the first direction, the incident optical system is disposed on a side of the image height region of the first direction. Curvature of the first face in the sub scanning direction cross section decreases from on axis toward off axis in a main scanning direction, and curvature of the second face in the sub scanning direction cross section increases from off axis of the first direction toward the second direction in the main scanning direction.

The image forming apparatus according to another aspect of the present disclosure includes an image carrier which carries an electrostatic latent image, and an optical scanning device which irradiates a light beam, with a peripheral surface of the image carrier being used as a surface to be scanned, wherein the optical scanning device includes the foregoing configuration.

DETAILED DESCRIPTION

Figure 1:
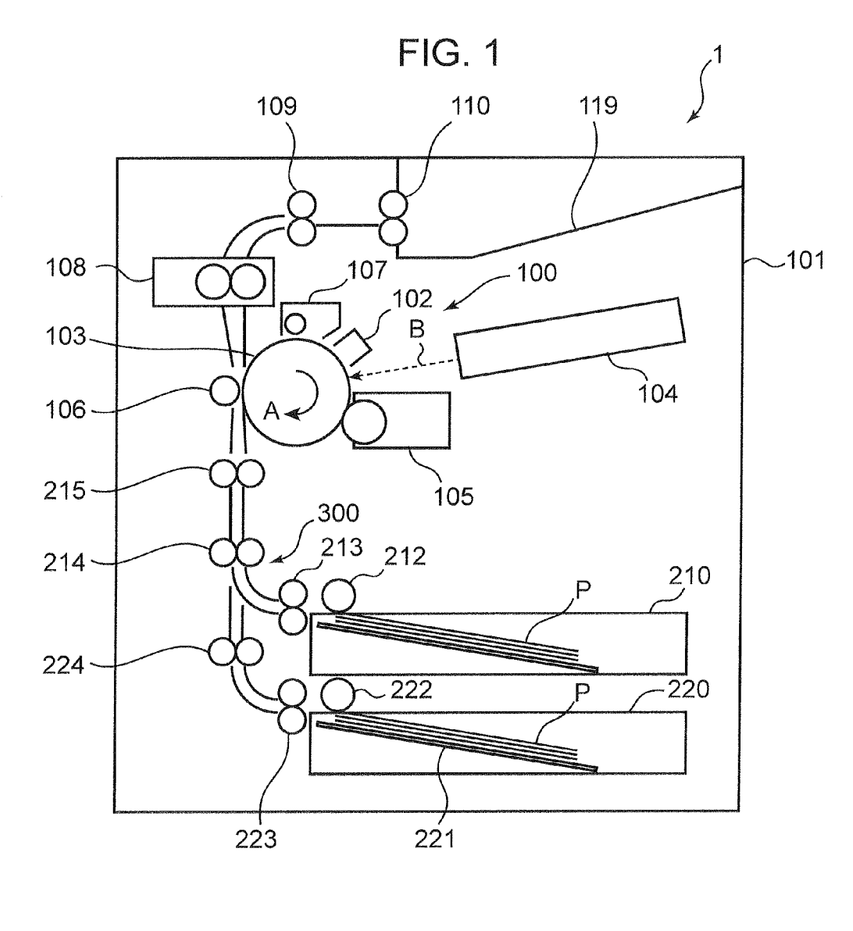
FIG. 1 is a cross section showing the schematic configuration of the printer according to one embodiment of the present disclosure.

The optical scanning device according to one embodiment of the present disclosure is now explained with reference to the appended drawings. FIG. 1 is a cross section showing the schematic configuration of a printer 1 (example of an image forming apparatus) according to one embodiment of the present disclosure. Note that the image forming apparatus is not limited to the printer 1, and may also be a copier, a facsimile, a multi-function machine or the like. The printer 1 includes a box-shaped housing 101, and an image forming unit 100, an optical scanning device 104, and paper feeding cassettes 210, 220 housed in the housing 101. The paper feeding cassettes 210, 220 are detachably mounted on a bottom part of the printer 1.

The image forming unit 100 performs processing of forming a toner image on a sheet, and includes a charging device 102, a photoreceptor drum 103 (image carrier), a developing device 105, a transfer roller 106, a cleaning device 107, and a fixing unit 108.

The photoreceptor drum 103 is a cylindrical member, and an electrostatic latent image and a toner image are formed on a peripheral face thereof. The photoreceptor drum 103 receives drive force from a motor not shown, and is rotated in a clockwise direction shown with an arrow A in FIG. 1. The charging device 102 substantially uniformly charges the surface of the photoreceptor drum 103.

The developing device 105 supplies a toner to the peripheral surface of the photoreceptor drum 103, on which an electrostatic latent image was formed, and thereby forms a toner image. The developing device 105 includes a developing roller for carrying the toner, and a screw for agitating and delivering the toner. The toner image formed on the photoreceptor drum 103 is transferred to a sheet that is fed from the paper feeding cassettes 210, 220 and delivered to a feeding path 300. The toner is supplied to the developing device 105 from a toner container not shown.

The transfer roller 106 is disposed facing a lateral side of the photoreceptor drum 103, and a transfer nip portion is formed by the transfer roller 106 and the photoreceptor drum 103. The transfer roller 106 is configured from a rubber material with conductivity and provided with a transfer bias, and transfers the toner image formed on the photoreceptor drum 103 to the sheet. The cleaning device 107 cleans the peripheral surface of the photoreceptor drum 103 after the toner image is transferred.

The fixing unit 108 includes a fixing roller with a heater build therein, and a pressure roller provided at a position facing the fixing roller. The fixing unit 108 fixes the toner image, which was transferred to a sheet, on the sheet while conveying and heating the sheet with the toner image formed thereon with the rollers.

The optical scanning device 104 forms an electrostatic latent image by irradiating a laser beam according to image data that is input from external equipment such as a personal computer to the peripheral surface (surface to be scanned) of the photoreceptor drum 103 that was substantially uniformly charged by the charging device 102. The optical scanning device 104 will be described in detail later.

The paper feeding cassettes 210, 220 house a plurality of sheets P to which images are to be formed. A feeding path 300 for delivering the sheets is disposed between the paper feeding cassettes 210, 220 and the image forming unit 100. The feeding path 300 is provided with paper feed roller pairs 213, 223, transport roller pairs 214, 224, and a resist roller pair 215. Moreover, disposed on the downstream side of the fixing unit 108 are a transport roller pair 109, and a discharge roller pair 110 for discharging the sheets to the paper discharge tray 119.

The image forming operation of the printer 1 is now briefly explained. Foremost, the peripheral surface of the photoreceptor drum 103 is substantially uniformly charged with the charging device 102. The charged peripheral surface of the photoreceptor drum 103 is exposed by a laser beam emitted from the optical scanning device 104, and an electrostatic latent image of the image to be formed on the sheet P is formed on the peripheral surface of the photoreceptor drum 103. The electrostatic latent image is developed as a toner image as a result of the toner being supplied from the developing device 105 to the peripheral surface of the photoreceptor drum 103. Meanwhile, the sheet P is fed from the paper feeding cassettes 210, 220 to the feeding path 300 by the pickup rollers 212, 222, and delivered to the transport roller pairs 214, 224. Subsequently, the sheet P is once stopped by the resist roller pair 215, and delivered to the transfer nip portion between the transfer roller 106 and the photoreceptor drum 103 at a predetermined timing. The toner image is transferred to the sheet P as a result of the sheet P passing through the transfer nip portion. After the foregoing transfer operation, the sheet P is delivered to the fixing unit 108, and the toner image is fixed to the sheet P. Subsequently, the sheet P is discharged to the paper discharge tray 119 by the transport roller pair 109 and the discharge roller pair 110.

Figure 2:
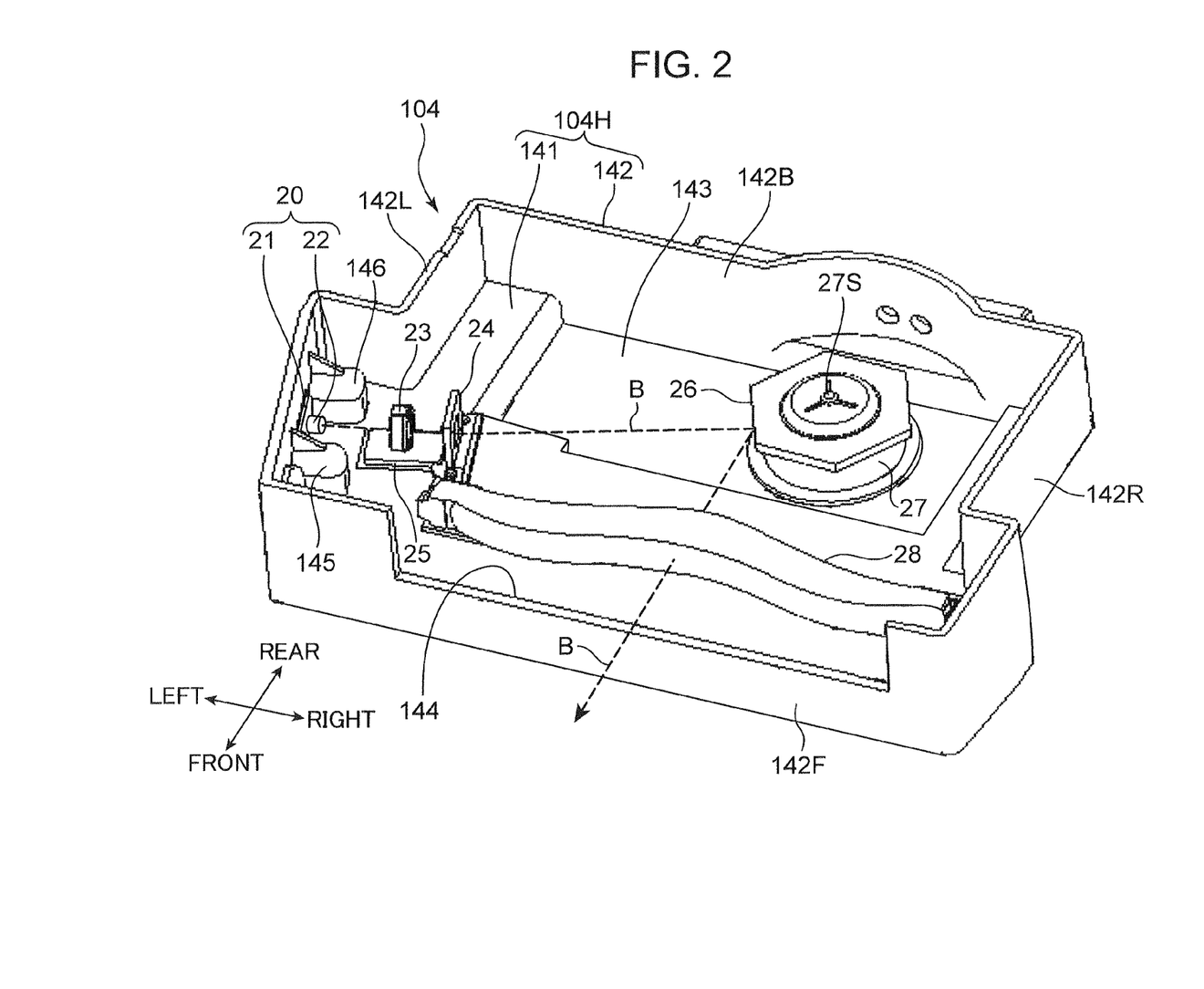
FIG. 2 is a perspective view showing the internal structure of the optical scanning device according to the embodiment.
Figure 3:
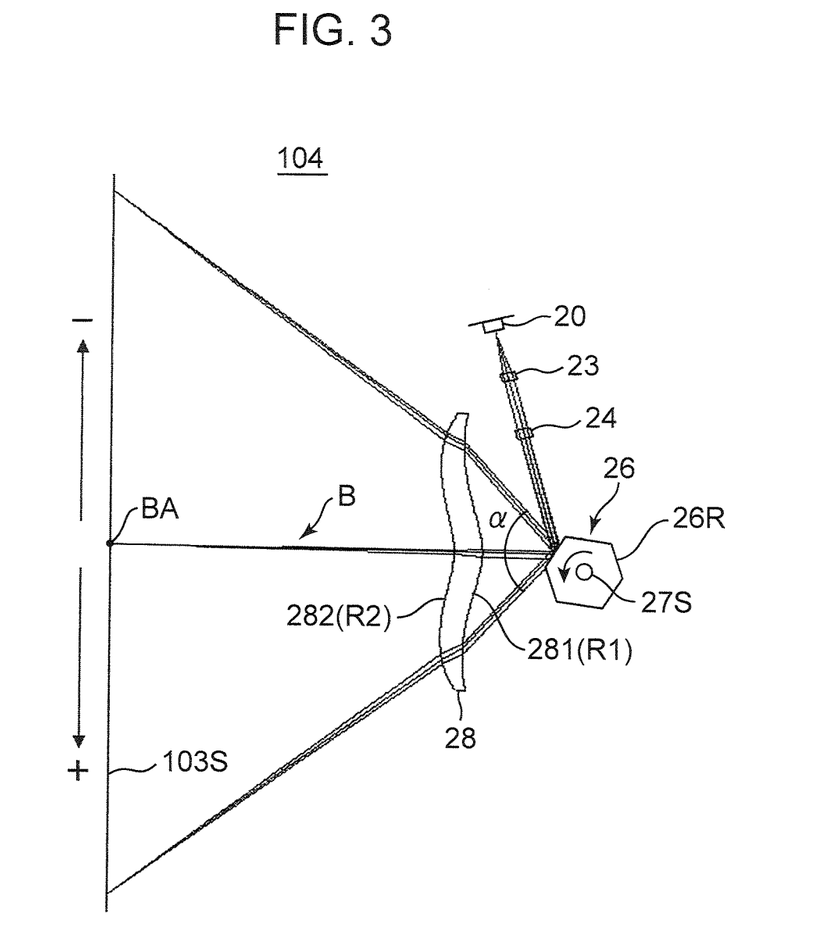
FIG. 3 is a light path diagram showing the configuration of the optical scanning device in the main scanning cross section.

The detailed structure of the optical scanning device 104 according to this embodiment is now explained. FIG. 2 is a perspective view showing the internal structure of the optical scanning device 104, and FIG. 3 is a light path diagram showing the configuration of the optical scanning device 104 in the main scanning cross section. The optical scanning device 104 includes a housing 104H, and a laser unit 20 (light source), a collimator lens 23 (part of the incident optical system), a cylindrical lens (part of the incident optical system), a polygon mirror 26 (deflector), and a fθ lens 28 (scanning lens) housed in the housing 104H. In the indication of directions shown in FIG. 2, the left-right direction is the main scanning direction. The optical scanning device 104 of this embodiment is an optical scanning device in which the scanning lens is configured from only one lens (fθ lens 28).

The housing 104H includes a bottom plate 141 as a base member on which various members are mounted, side plates 142 that are erected substantially vertically from the peripheral edges of the bottom plate 141, and a cover for covering the upside of the side plates 142. Note that, in FIG. 2, since a state where the cover has been removed is shown, the cover is not indicated. The housing 104H has a substantially square shape when viewed from the top face. The side plates 142 include a front side plate 142F which faces a peripheral surface 103S of the photoreceptor drum 103 when the optical scanning device 104 is mounted on the printer 1, a rear side plate 142B which faces the front side plate 142F, and a right side plate 142R and a left side plate 142L which connect both sides of the front side plate 142F and the rear side plate 142B.

The bottom plate 141 is provided with a recess 143 at a location which is adjacent to the rear side plate 142B and which has a height that is lower than its surroundings. A polygon mirror 26 is disposed in the recess 143, and the laser unit 20, the collimator lens 23, the cylindrical lens 24 and the fθ lens 28 are disposed in a region other than the recess 143 of the bottom plate 141. The front side plate 142F is provided with a window part 144 which is formed by notching the front side plate 142F from the upper edge up to around the intermediate portion thereof. Even in a state where the cover (not shown) is mounted, the window part 144 remains an opening of the housing 104H. Moreover, a first holding member 145 and a second holding member 146 are provided on a top face of the bottom plate 141 near the left side plate 142L. A minute gap is provided between the left side plate 142L and the first holding member 145, and between the left side plate 142L and the second holding member 146, respectively.

The laser unit 20 includes a substrate 21, and a substantially cylindrically shaped semiconductor laser 22 mounted on one face of the substrate 21. The semiconductor laser 22 is a light source which emits a laser beam B (light beam) of a predetermined wavelength. Mounted on the substrate 21 are a semiconductor laser 22, and a drive circuit component for driving the semiconductor laser 22. The laser unit 20 is mounted on the top face of the bottom plate 141 such that the substrate 21 is sandwiched in the gap formed between the first holding member 145 and the left side plate 142L and the gap formed between the second holding member 146 and the left side plate 142L respectively, and such that the semiconductor laser 22 is fitted between the first holding member 145 and the second holding member 146. The irradiation position of the laser beam B can be adjusted by adjusting the position that the substrate 21 is fitted into the gap.

The collimator lens 23 converts the laser beam B, which is emitted from the semiconductor laser 22 and diffused, into parallel light or light that is close to parallel. The collimator lens 23 is mounted on a slide plate 25, and the slide plate 25 can move in the optical axis direction on the bottom plate 141. The mounting position of the collimator lens 23 can be adjusted by moving the slide plate 25.

The cylindrical lens 24 converts the parallel light into linear light that is long in a main scanning direction, and images the linear light on a reflecting surface of the polygon mirror 26.

The polygon mirror 26 is a polygonal mirror in which a deflective surface 26R is formed along each side of a regular hexagon. A rotating axis 27S of the polygon motor 27 is connected to the center position of the polygon mirror 26. The polygon mirror 26 rotates around the rotating axis 27S as a result of the polygon motor 27 being rotatively driven, and deflects and scans the laser beam B which is emitted from the semiconductor laser 22 and imaged via the collimator lens 23 and the cylindrical lens 24.

The collimator lens 23 and the cylindrical lens 24 are an incident optical system which causes the laser beam B to enter the polygon mirror 26, and in this embodiment is configured from an oblique-incident optical system. Referring to FIG. 3, in the main scanning direction cross section, with an on-axis point BA where an on-axis light beam comes into contact with the surface to be scanned (peripheral surface 103S) as the reference regarding the scanning range, the regions are separated as follows; namely, a direction (first direction) that is upstream of the rotating direction (indicated with an arrow in FIG. 3) of the polygon mirror 26 is set as the minus-side image height region, and the downstream side direction (second direction) is set as the plus-side image height region. In the foregoing separation, the incident optical system is disposed on a side of the minus-side image height region.

The fθ lens 28 is a lens having a distortion (fθ characteristics) in which the angle of the incident light and the image height are of a proportional relation, and is a lens that is elongated in the main scanning direction. The fθ lens 28 is disposed between the window part 144 and the polygon mirror 26. The laser beam B reflected off the polygon mirror 26 is condensed by the fθ lens 28, and images on the peripheral face 103S of the photoreceptor drum 103 through the window part 144 of the housing 104H. The fθ lens 28 is manufactured by molding a translucent resin material in a metal mold. The fθ lens 28 includes an entrance face 281 (first face; hereinafter referred to as the "R1 face") which faces the polygon mirror 26 and to which the laser beam B enters, and an exit face 282 (second face; hereinafter referred to as the "R2 face") which is a face on a side that is opposite to the entrance face 281 and from which the laser beam B exits.

Figure 4:
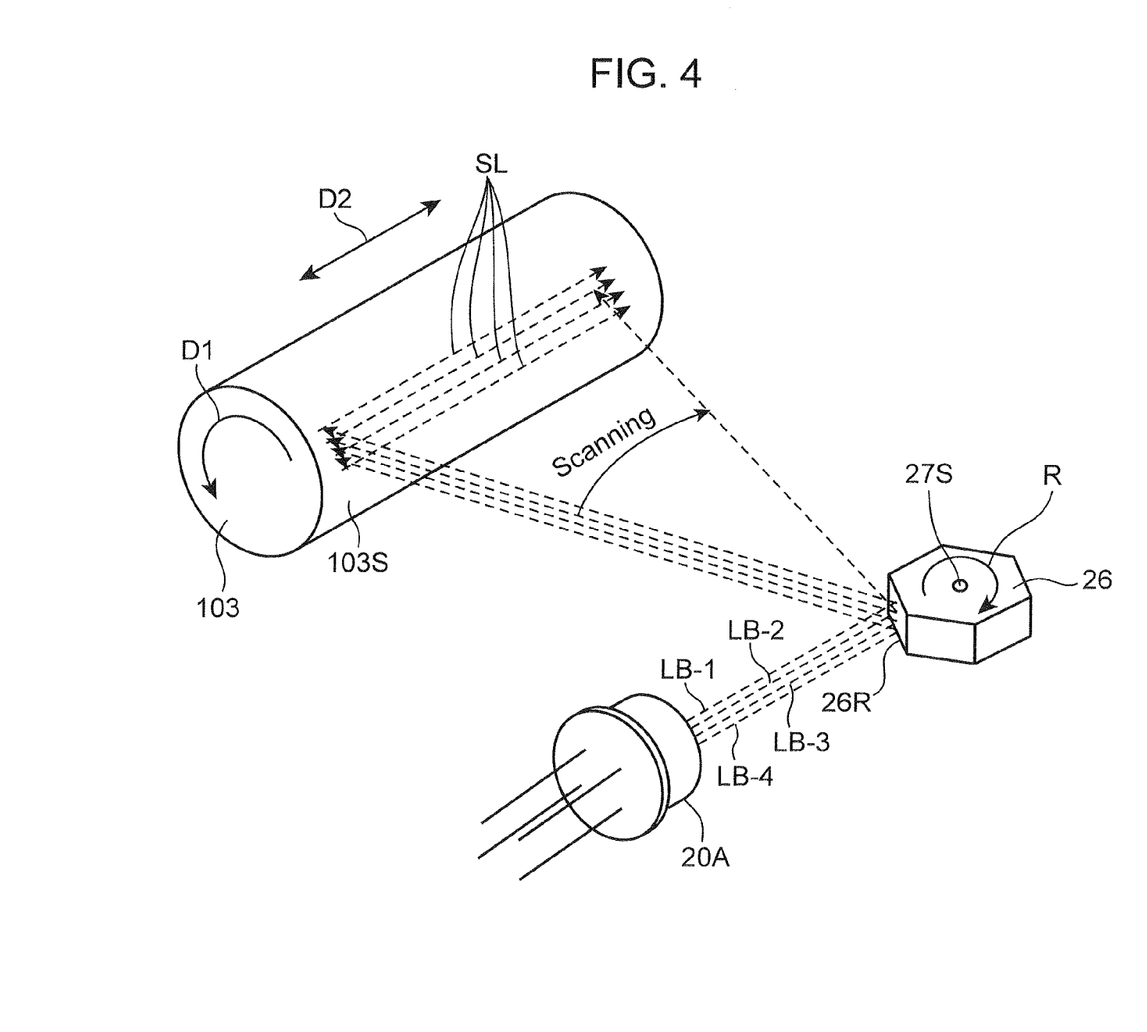
FIG. 4 is a schematic perspective view explaining the exposure status of the photoreceptor drum in the case of using a light source of the multibeam method.

FIG. 4 is a schematic perspective view explaining the exposure status of the photoreceptor drum 103 in the case of using the laser unit 20A of the multibeam method as the light source. Here, illustrated is a laser unit 20A which emits four laser beams LB-1 to LB-4. The laser unit 20A includes four semiconductor laser (not shown) arranged linearly at given intervals.

Pursuant to the rotation of the photoreceptor drum 103 in an arrow D1 direction (sub scanning direction D1) and the rotation of the polygon mirror 26 around the rotating axis 27S, the four laser beams LB-1 to LB-4 are reflected off the deflective surface 26R of the polygon mirror 26, the peripheral surface 103S (surface to be scanned) of the photoreceptor drum 103 is scanned along the main scanning direction D2. Consequently, four scanning lines SL are drawn on the peripheral surface 103S. Since the laser beams LB-1 to LB-4 are modulated according to the image data, an electrostatic latent image according to the image data is formed on the peripheral surface 103S of the photoreceptor drum 103.

Here, the four laser beams LB-1 to LB-4 draw the four scanning lines SL in the main scanning direction D2 in a state of being arranged in the order of laser beams LB-1, LB-2, LB-3, LB-4 in the sub scanning direction D1. This is because, as described above, the four semiconductor lasers are arranged linearly in given intervals. The beam pitch of these laser beams LB-1 to LB-4 in the sub scanning direction defines the resolution (dpi) of the drawn image. Accordingly, with the scanning optical system equipped in the optical scanning device 104 it is important that the laser beams LB-1 to LB-4 are imaged on the peripheral surface 103S so that the beam pitch does not change due to the image height.

In the optical scanning device 104 explained above, there are demands for shortening the gap between the polygon mirror 26 and the peripheral surface 103S of the photoreceptor drum 103 in order to downsize the optical scanning device 104 itself. In the foregoing case, the focal distance of the fθ lens 28 needs to be shortened. When the same scanning width is scanned using the fθ lens 28 having a short focal distance, the oscillating angle α (refer to FIG. 3) of the light beam based on the polygon mirror 26 needs to be increased. In the foregoing case, the difference between the light path length of the on-axis light beam and the light path length of the off-axis light beam of the fθ lens 28 will increase. In other words, the light path length of the light beam deflected by the polygon mirror 26 reaching the end part of the minus-side and plus-side image height regions will be considerably longer than the light path length of the light beam deflected by the polygon mirror 26 reaching the on-axis point BA of the surface to be scanned.

Here, when the distance from the deflective surface 26R of the polygon mirror 26 to the principal point of the fθ lens 28 on the R1 face side in the sub scanning direction, of an arbitrary image height is Ai, the distance from the principal point of the fθ lens 28 on the R2 face side in the sub scanning direction to the peripheral surface 103S (field), of an arbitrary image height is Bi, and the focal distance of the fθ lens 28 of an arbitrary image height is fsi, the relation thereof can be represented with following Formula (1).

$$\frac{1}{A_i} + \frac{1}{B_i} = \frac{1}{f_{si}} \quad (1)$$

Figure 5:
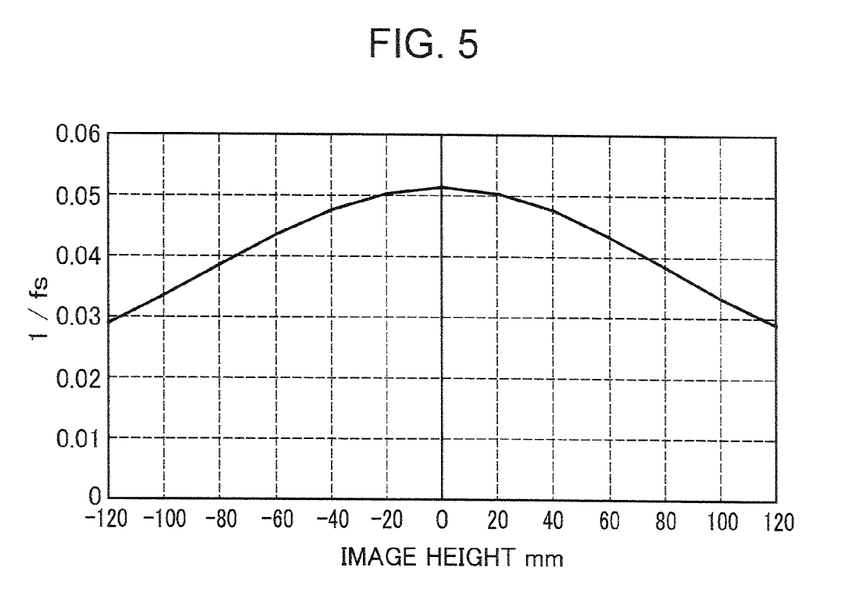
FIG. 5 is a graph showing the fluctuation of the focal distance of the scanning lens in the sub scanning direction relative to the image height in the case of not applying the present disclosure.

Here, assuming that the curvature of the R1 face and the R2 face of the fθ lens 28 in the sub scanning direction cross section is the same on axis and off axis, the fsi in foregoing Formula (1) will fluctuate considerably. FIG. 5 is a graph showing the relation of the focal distance of the fθ lens 28 in the sub scanning direction relative to the image height in the foregoing case. As evident from FIG. 5, the value of 1/fsi takes on a value in a range of 0.051 to 0.029 between on axis and off axis, and it can be understood that the difference between the two is great. Under the foregoing circumstances, the spot diameter of the laser beam B will not be uniform depending on the image height. Moreover, when the laser unit 20A of the multibeam method shown in FIG. 4 is used as the light source, the beam pitch will change depending on the image height. Accordingly, the image quality will deteriorate.

In this embodiment, the face shape of the R1 face and the R2 face of the fθ lens 28 is devised so that the foregoing spot diameter and multibeam beam pitch will be uniform as possible in all image heights. Foremost, with respect to the R1 face, the curvature of the R1 face in the sub scanning direction cross section is set to decrease from on axis toward off axis in the main scanning direction.

Figure 6A:
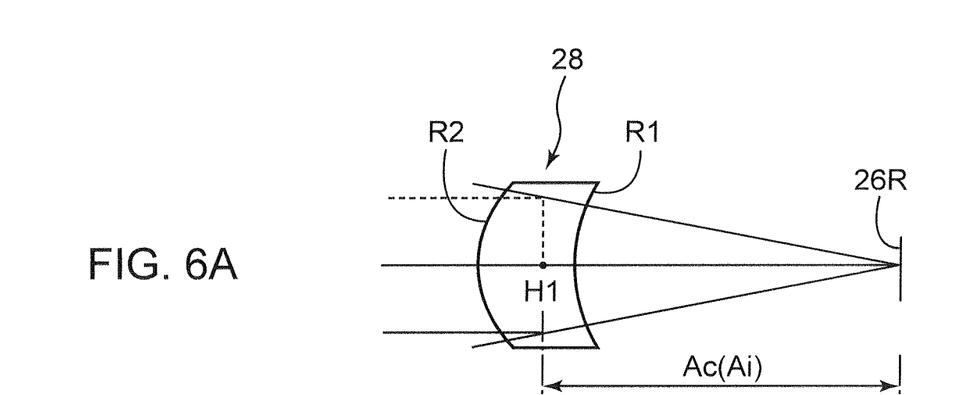
FIG. 6A and FIG. 6B are diagrams explaining the distance between the principal point of the scanning lens in the sub scanning direction, and the deflective surface and the surface to be scanned.
Figure 6B:
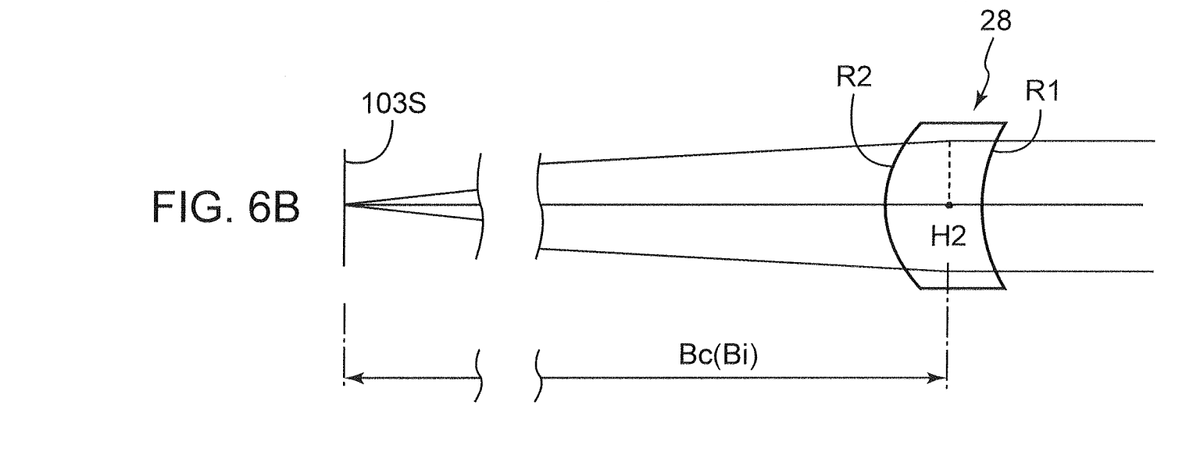

FIG. 6A is a diagram explaining the distance between the principal point of the fθ lens 28 in the sub scanning direction and the deflective surface 26R, and FIG. 6B is a diagram explaining the distance between the principal point of the fθ lens 28 in the sub scanning direction and the peripheral surface 103S (surface to be scanned). Referring to these diagrams, the distance on axis from the deflective surface 26R of the polygon mirror 26 to the principal point H1 of the fθ lens 28 on the R1 face side in the sub scanning direction is Ac, the distance on axis from the principal point H2 on the R2 face side in the sub scanning direction to the peripheral surface 103S (field) is Bc, and the focal distance of the fθ lens 28 on axis is fsc. Moreover, the curvature of the R1 face of an arbitrary image height is $R\_{1i}$, and the curvature of the R1 face on axis is $R\_1C$.

Generally speaking, the relation of the lens curvature R and the curvature radius r is represented by following Formula (2). Moreover, the relation of the lens focal distance f, and the refractive index n in the air and lens refractive index n' is represented by following Formula (3).

$$R = \frac{1}{r} \quad (2)$$

$$-\frac{n}{f} = \frac{(n - n')}{r} \quad (3)$$

Based on foregoing Formula (2) and Formula (3), when the lens curvature of an arbitrary image height is Ri, the 1/fsi of foregoing Formula (1) will be, as shown in following Formula (4), a relation that is proportional to Ri. Moreover, when the on-axis lens curvature is Rc, following Formula (5) is established.

$$\frac{1}{A_i} + \frac{1}{B_i} = \frac{1}{f_{si}} \propto R_i \quad (4)$$

$$\frac{1}{A_C} + \frac{1}{B_C} = \frac{1}{f_{sc}} \propto R_C \quad (5)$$

Thus, following Formula (6) is established based on Formula (4) and Formula (5).

$$R\_{1i} \propto R\_{1C} \times \left(\frac{1}{A_i} + \frac{1}{B_i}\right) / \left(\frac{1}{A_C} + \frac{1}{B_C}\right) \quad (6)$$

As a result of setting the curvature of the R1 face based on foregoing Formula (6), the value of the focal distance fs of the fθ lens 28 in the sub scanning direction relative to the image height can be made uniform. In addition, as with the conventional technology, in order to avoid the symbol of the curvature of the R1 face from inverting from on axis toward off axis, the lens curvature Ri should be set to a value that is not less than zero in an arbitrary image height. Thus, the curvature of the R1 face should be set according to following Formula (7). Consequently, the curvature of the R1 face in the sub scanning direction cross section will decrease from on axis toward off axis in the main scanning direction.

$$0 \leq R\_{1i} \leq R\_{1C} \times \left(\frac{1}{A_i} + \frac{1}{B_i}\right) / \left(\frac{1}{A_C} + \frac{1}{B_C}\right) \quad (7)$$

Next, with respect to the R2 face, the curvature of the R2 face in the sub scanning direction cross section is set to increase from off axis of the image height region of the minus direction (first direction) in the scanning range of the main scanning direction toward the plus direction (second direction). Preferably, the curvature of the R2 face is set to have an extreme value of the curvature in an image height region other than off axis in the plus direction.

Figure 7:
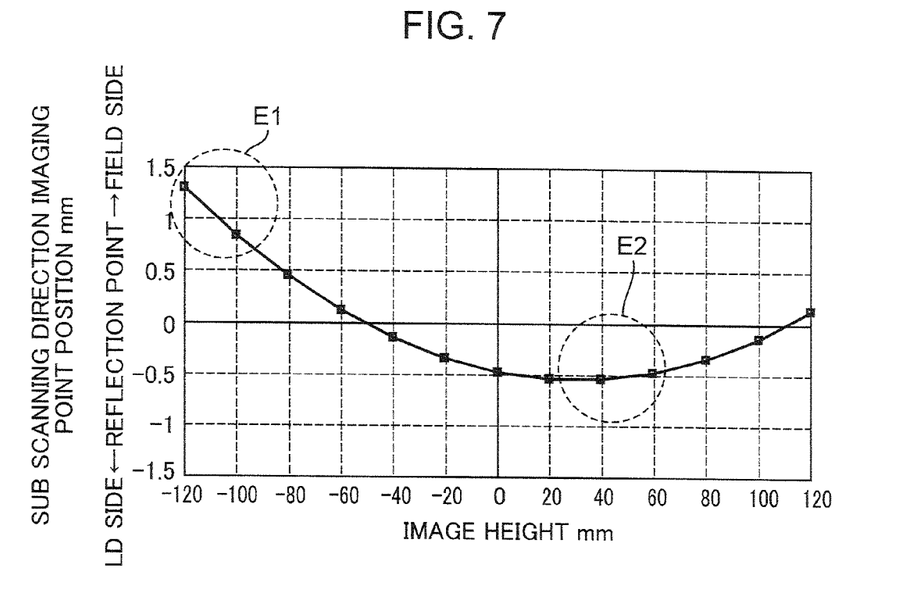
FIG. 7 is a graph showing the relation of the image height and the imaging position in the sub scanning direction.

Upon downsizing the optical scanning device 104, the oscillating angle of the light beam by using the polygon mirror 26 needs to be increased as described above. In the foregoing case, the position of the deflective surface 26R of the polygon mirror 26 will change relatively greatly in the optical axis direction. FIG. 7 is a graph showing the relation of the image height, and the imaging position in the sub scanning direction near the deflective surface 26R. As evident from FIG. 7, it can be seen that the respective imaging positions have moved toward the laser unit 20 side near on axis and in the plus-direction image height region, and toward the drum peripheral surface 103S in the minus-direction image height region. This kind of asymmetric nature is caused by the positional displacement of the deflective surface 26R of the polygon mirror 26 and the rotating axis 27S of the polygon mirror 26.

Figure 8:
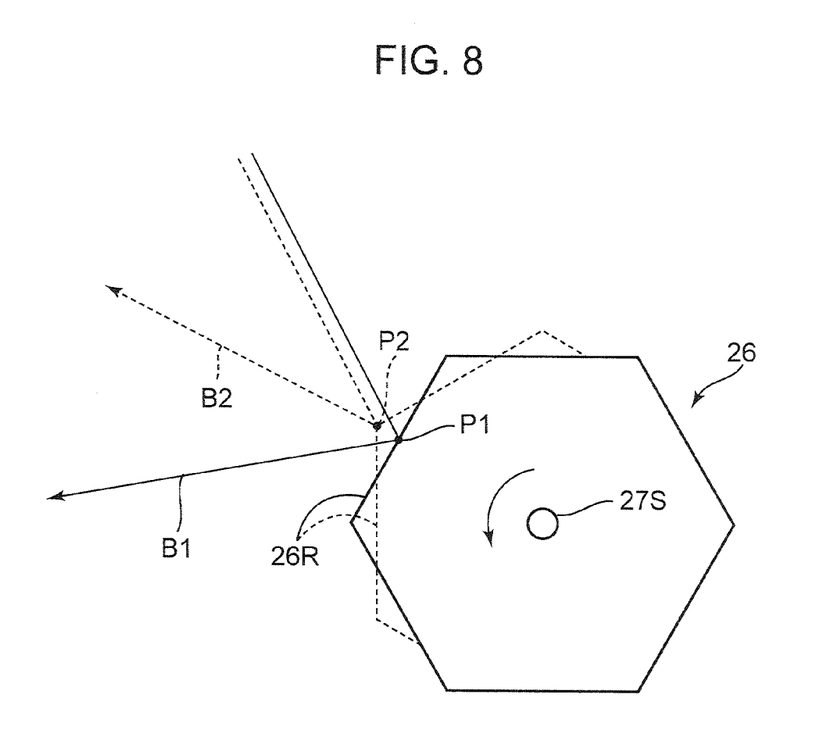
FIG. 8 is a diagram explaining the position variation factor of the deflective surface of the polygon mirror.

FIG. 8 is a schematic diagram explaining the position variation factor of the deflective surface 26R of the polygon mirror 26. The polygon mirror 26 includes six deflective surfaces 26R, and performs scanning once on each deflective surface 26R. The laser beam B1 shown with a solid line in FIG. 8 is reflected off the center point P2 of one deflective surface 26R, and heads toward the center of the drum peripheral surface 103S in the main scanning direction. Meanwhile, the laser beam B2 shown with a dotted line in FIG. 8 is reflected off the point P2 near the end of the deflective surface 26R, and heads toward off axis of the minus-direction image height region. Here, upon comparing the positions of the point P1 and the point P2, it can be seen that the positions of the two are different. This is the factor that causes the movement of the imaging position as shown in FIG. 7.

Figure 9A:
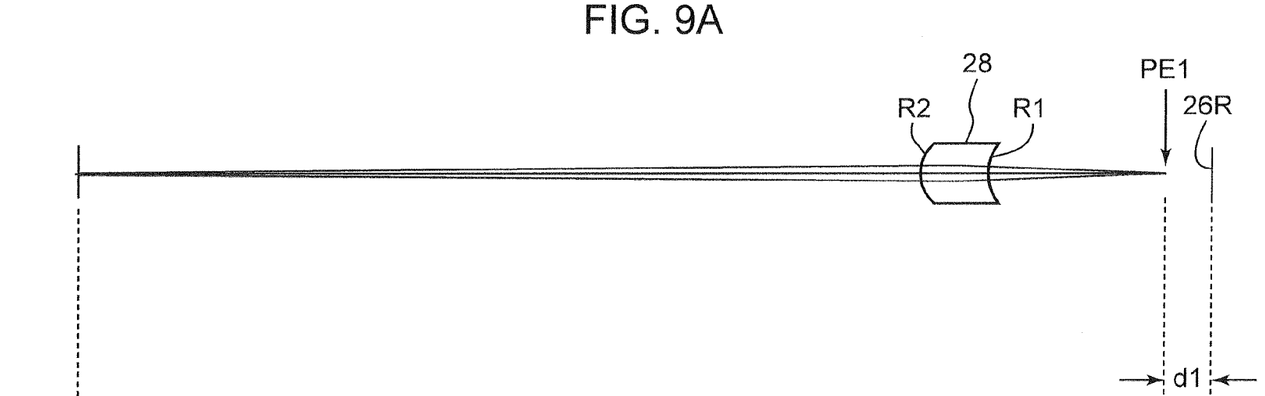
FIG. 9A and FIG. 9B are schematic diagrams explaining the fluctuation of the imaging position due to the image height.
Figure 9B:
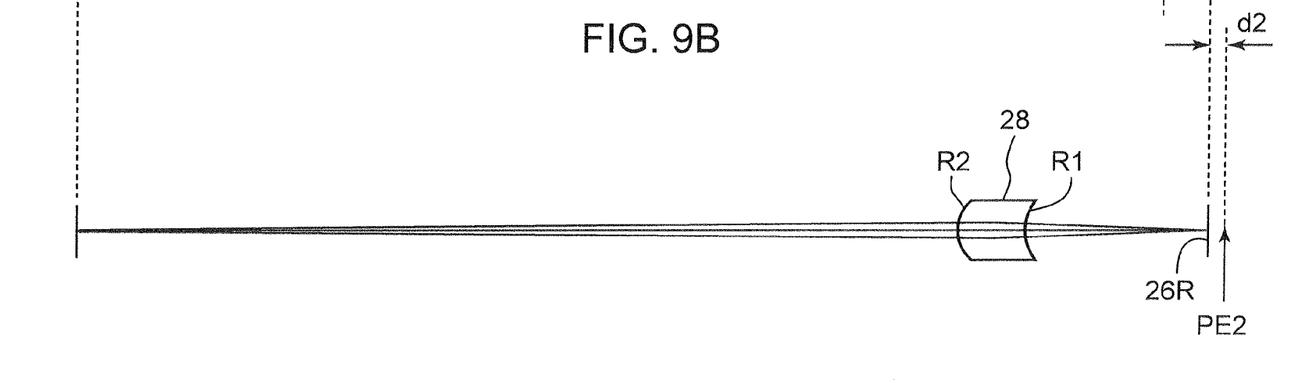

FIG. 9A and FIG. 9B are schematic diagrams showing the fluctuation of the imaging position in case viewing the position of the deflective surface 26R in a fixed manner. FIG. 9A is a diagram showing the imaging state of the laser beam B near off axis of the minus-direction image height region shown with the symbol E1 in FIG. 7, and FIG. 9B is a diagram showing the imaging state of the laser beam B at an image height near +40 mm (region where the imaging point has moved most toward the laser unit 20 side) shown with the symbol E2 in FIG. 7. In the E1 region, this will be the imaging position PE1 that shifted toward the drum peripheral surface 103S by a distance d1 from the ideal imaging position (in the foregoing case, position of the deflective surface 26R). In the E2 region, this will be the imaging position PE2 that shifted toward the laser unit 20 by a distance d2 from the ideal imaging position. In the example of FIG. 7, d1 is approximately 1.3 mm, and d2 is approximately −0.5 mm. The foregoing distances d1 and d2 tend to increase as the oscillating angle of the light beam by using the polygon mirror 26 becomes greater.

In order to compensate the foregoing fluctuation of the imaging position, the curvature of the R2 face in the sub scanning direction cross section is set to monotonously increase from off axis of the minus-direction image height region in the scanning range of the main scanning direction toward the plus direction. Note that the reason why the fluctuation of the imaging position is compensated by using the R2 face is because the correction effect is greater when the R2 face, which is separated farther from the polygon mirror 26 than the R1 face, is used.

EXAMPLES

An example of the construction data of the imaging optical system which satisfies the requirements of the optical scanning device 104 according to the foregoing embodiments is shown as the Example. The imaging optical system of the Example is configured, as shown in FIG. 3, in order from the semiconductor laser 22 side, from one collimator lens 23, one cylindrical lens 24, and one fθ lens 28. Moreover, the optical performance of the respective lenses of the Example and the face shape of the fθ lens 28 are as per Table 1.

TABLE 1

| Collimator Lens | | Cylindrical Lens | |
|---|---|---|---|
| f | 18 | f | 50 |
| Fb | 330 | n | 1.48 |
| n | 1.51 | | |
| fθ Lens | | | |
| f | 373 | Polygon-fθ distance | 23 |
| n | 1.5 | fθ-field distance | 112 |
| d | 9 | | |

| Main Scanning | | Sub Scanning | |
|---|---|---|---|
| R1 | | | |
| Rm | 2.998E+01 | Rs0 | 1.002E+01 |
| Ky | −1.268E+01 | Kx | 0 |
| A1 | −7.921E−03 | B1 | −5.686E−02 |
| A2 | 2.142E−03 | B2 | 2.703E−02 |
| A3 | −4.218E−06 | B3 | −4.447E−05 |
| A4 | −5.398E−06 | B4 | 1.546E−04 |
| A5 | 4.288E−10 | B5 | −1.020E−07 |
| A6 | 5.760E−10 | B6 | −3.487E−07 |
| A7 | 2.349E−12 | B7 | −2.265E−10 |
| A8 | 2.079E−13 | B8 | 9.136E−10 |
| A9 | −7.852E−16 | B10 | −5.881E−13 |
| A10 | 1.579E−17 | | |
| R2 | | | |
| Rm | 2.690E+01 | Rs0 | 7.581E+00 |
| Ky | −9.494E+00 | Kx | 3.100E−06 |
| A1 | −4.933E−03 | B1 | −1.626E−02 |
| A2 | −1.073E−03 | B2 | 1.317E−02 |
| A3 | −7.925E−06 | B3 | −4.606E−06 |
| A4 | −5.225E−06 | B4 | −2.075E−06 |
| A5 | 2.549E−09 | B5 | 4.167E−11 |
| A6 | 3.828E−10 | B6 | −9.724E−10 |
| A7 | −8.032E−13 | B7 | 7.896E−13 |
| A8 | −1.775E−13 | B8 | −5.106E−13 |

TABLE 1-continued

| A9 | 2.017E−16 | B10 | −4.400E−18 |
| A10 | −5.475E−18 | | |

In Table 1, Fb represents the back focus of the collimator lens 23. "Polygon-fθ distance" represents the distance between the R1 face of the fθ lens 28 and the deflective surface 26R of the polygon mirror 26, and "fθ-field distance" represents the distance between the R2 face of the fθ lens 28 and the peripheral surface 1035 of the photoreceptor drum 103, respectively. Note that the unit of f, Fb, d, "Polygon-fθ distance", and "fθ-field distance" in Table 1 is millimeters. Moreover, in Table 1, "R1" column represents the face shape of the R1 face (entrance face 281) of the fθ lens 28, and "R2" column represents the face shape of the R2 face (exit face 282) of the fθ lens 28, respectively. Note that Rm represents the main scanning curvature radius, Rs0 represents the sub scanning curvature radius, Ky represents the main scanning conic coefficient, Kx represents the sub scanning conic coefficient, and An and Bn (n is an integer) represent the high order coefficients of the face shape.

The face shape of the R1 face and the R2 face is defined based on the following formula showing the sag amount by using a local orthogonal coordinate system (x, y, z) with the face vertex as the origin and the direction of heading toward the peripheral surface 103S as the positive direction of the z axis. However, Zm (main scanning direction) and Zs (sub scanning direction) are the displacement (face vertex reference) in the z axis direction at the position of height Y, $Cm=1/Rm$, and $Cs=1/Rs$.

$$\text{Sag amount } Sag = Zm + Zs$$

$$Zm = \frac{Cm \cdot y^2}{1 + \sqrt{(1-(1+Ky)Cm^2 \cdot Y^2)}} + A1 \cdot y + A2 \cdot y^2 +$$

$$A3 \cdot y^3 + A4 \cdot y^4 + A5 \cdot y^5 + A6 \cdot y^6 + A8 \cdot y^8 + A10 \cdot y^{10}$$

$$Rs = Rs0 + B1 \cdot y + B2 \cdot y^2 + B3 \cdot y^3 + B4 \cdot y^4 +$$

$$B5 \cdot y^5 + B6 \cdot y^6 + B8 \cdot y^8 + B10 \cdot y^{10}$$

$$Zs = \frac{Cs \cdot x^2}{1 - \sqrt{(1-(1+Kx)Cs^2 \cdot x^2)}}$$

Figure 10A:
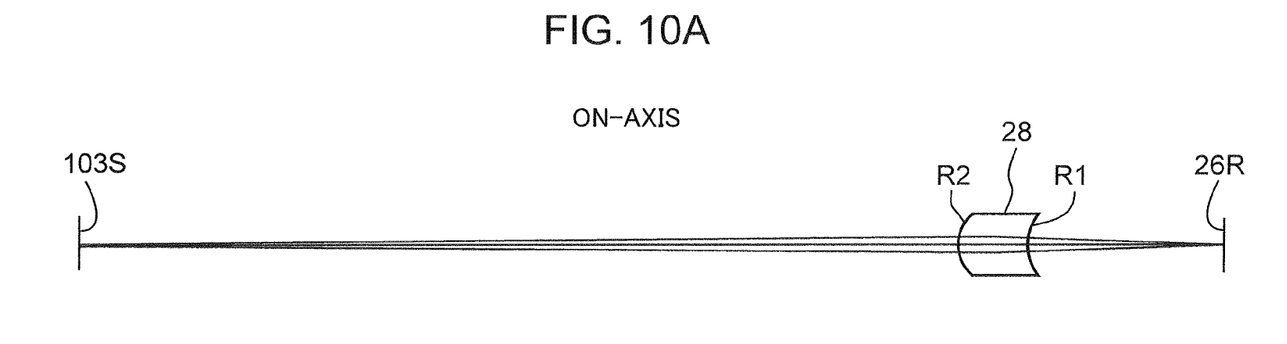
FIG. 10A is a light path diagram of the sub scanning direction cross section on the axis.
Figure 10B:
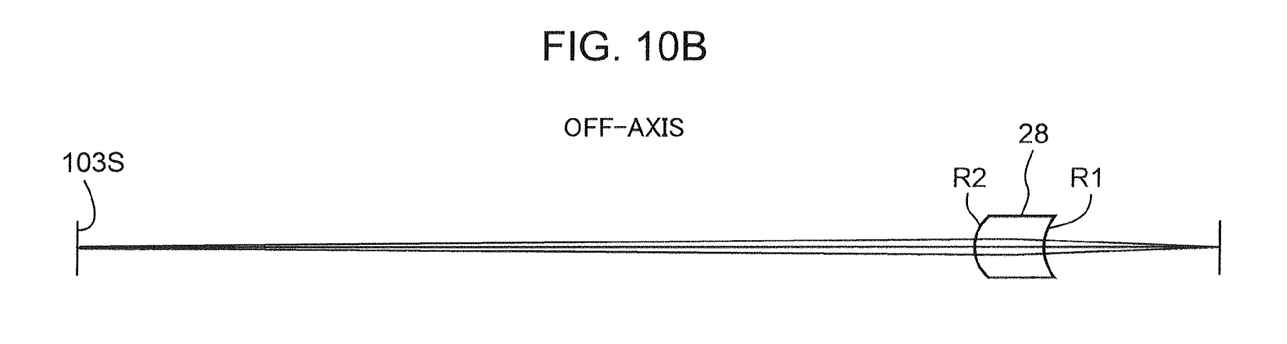
FIG. 10B is a light path diagram of the sub scanning direction cross section off the axis.
Figure 11:
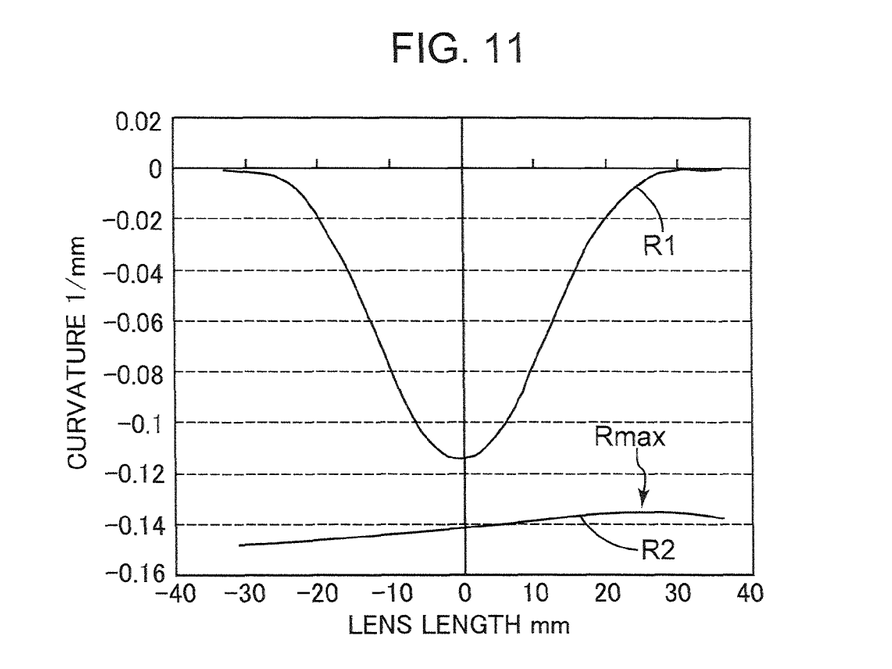
FIG. 11 is a graph showing the curvature change of the first face and the second face of the scanning lens in the sub scanning direction.
Figure 12:
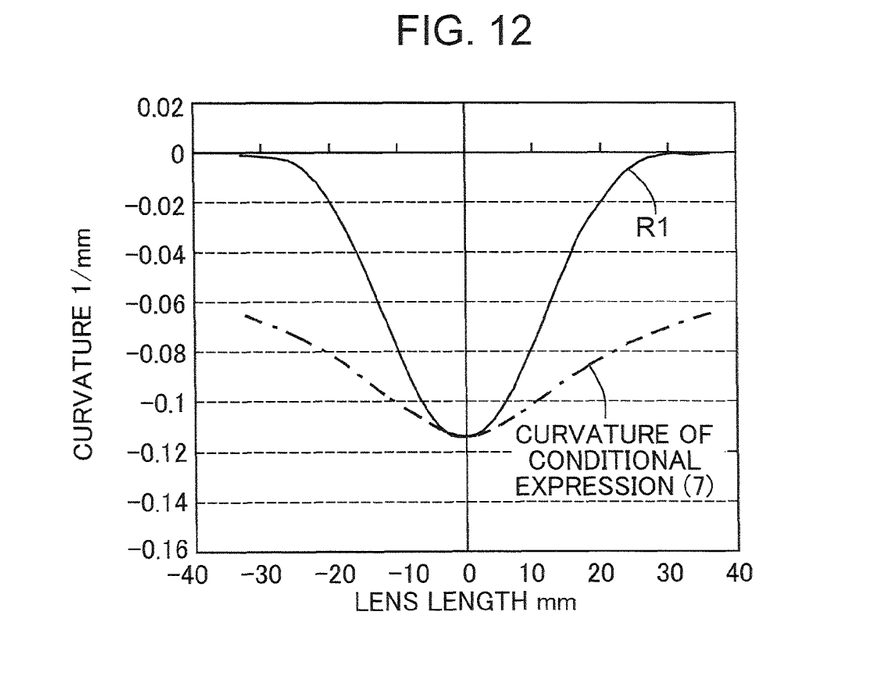
FIG. 12 is a graph showing the relation of the curvature change of the first face of the scanning lens in the sub scanning direction and the conditional equation.

FIG. 10A is a light path diagram on axis of the fθ lens 28 in the sub scanning direction cross section which was used in the Example, and FIG. 10B is a light path diagram off axis in the sub scanning direction cross section. FIG. 11 is a graph showing the curvature change of the R1 face and the R2 face of the fθ lens in the sub scanning direction that was used in the Example. FIG. 12 is a graph showing the relation between the curvature change of the R1 face in the sub scanning direction and the curvature obtained from foregoing Formula (7).

As evident from FIG. 10A to FIG. 12, with the R1 face, the on-axis sub scanning direction cross section has the greatest curvature, and the curvature decreases upon heading toward off axis in both the plus direction and the minus direction. The off-axis sub scanning direction cross section is substantially a flat surface. Moreover, as shown in FIG. 12, it can be seen that the curvature of the R1 face in the Example satisfies the requirements of the curvature obtained from foregoing Formula (7).

Moreover, as shown in FIG. 11, the curvature of the R2 face increases from off axis in the minus direction toward off axis in the plus direction, and has an extreme value Rmax near +25 mm with on axis as the reference. Accordingly, as a result of gradually increasing the curvature of the R2 face from off axis in the minus direction where the incident optical system is disposed toward off axis in the plus direction, and equipping one extreme value in the plus-direction image height region, changes in the imaging position as shown in FIG. 7 can be favorably compensated. In other words, by setting the position of the extreme value Rmax on the R2 face in correspondence with the asymmetric imaging position change shown in FIG. 7; specifically, in correspondence with the imaging position change having not an image height=0 mm, but having a bottom value near the image height of 20 to 40 mm, the asymmetric imaging position can be favorably compensated.

Note that the amount of change of the imaging position is, at maximum, roughly 2 mm as evident upon comparing the E1 region and the E2 region in FIG. 7. Meanwhile, the distance from one deflective surface 26R of the polygon mirror 26 to the fθ lens 28 is symmetrical relative to the optical axis, and the difference in the distance between the ends relative to the on-axis distance is roughly 13 mm. Since this differential distance is sufficiently great relative to the amount of change of the imaging position, even in a state where an extreme value Rmax is not equipped in the plus-direction image height region; that is, even in a state where the curvature of the R2 face simply increases from off axis in the minus direction toward off axis in the plus direction, changes in the imaging position can be compensated. Needless to say, the extreme value Rmax is provided in order to more favorably compensate the changes in the imaging position in the plus-direction image height region.

Figure 13:
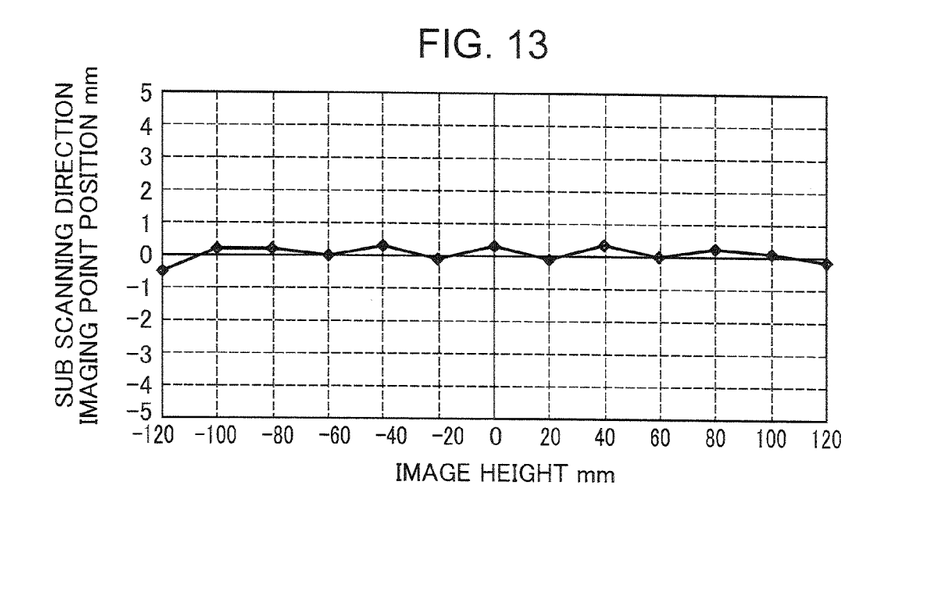
FIG. 13 is a graph showing the optical property of the optical scanning device having the optical system of the Example.

FIG. 13 is a graph showing the field curvature, in the sub scanning direction, of the optical scanning device equipped in the scanning optical system of the Example. As evident from FIG. 13, the field curvature of the scanning optical system of the Example in the sub scanning direction is within a range of 0.5 mm or less across the entire image height, and it was confirmed that this was of a problem-free level in practical application.

Figure 14:
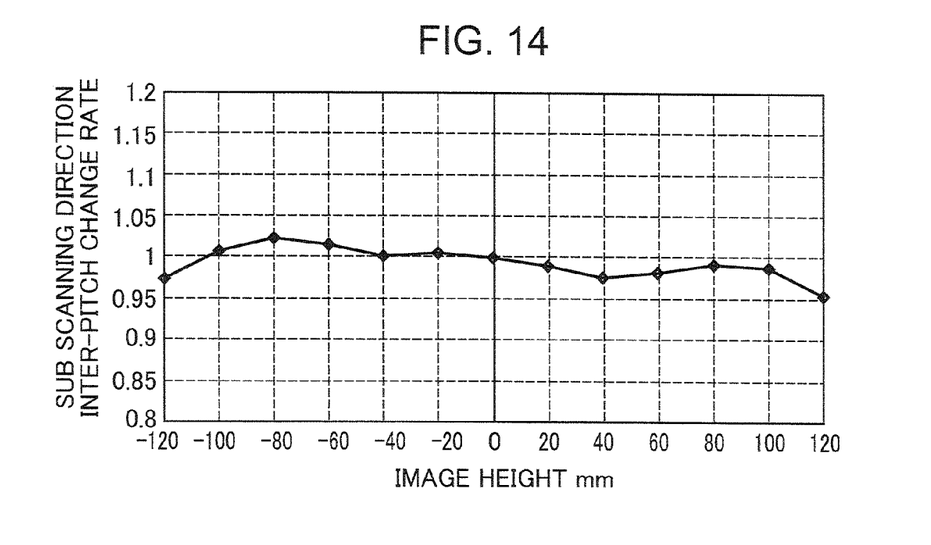
FIG. 14 is a graph showing the optical property of the optical scanning device having the optical system of the Example.

FIG. 14 is a graph showing the relation of the inter-pitch change of two laser beams in the sub scanning direction and the image height in a scanning optical system in which the laser 20 used in the foregoing Example is replaced with the laser unit 20A (refer to FIG. 4) of the multibeam method. Generally speaking, the tolerance of the inter-pitch change of the laser beam is roughly within ±10%. As evident from FIG. 14, with the scanning optical system of the Example, the inter-pitch change is within ±5% across the entire image height, and it can be seen that favorable optical performance is yielded.

According to the optical scanning device 104 of this embodiment explained above, with the R1 face (entrance face 281) of the fθ lens 28, the curvature in the sub scanning direction cross section decreases from on axis toward off axis in the main scanning direction. Meanwhile, with the R2 face (exit face 282), the curvature in the sub scanning direction cross section increases from off axis in the minus direction toward the plus direction in the main scanning direction.

With the R1 face, if the curvature in the sub scanning direction cross section is the same on axis and off axis, the variation in the focal distance of the fθ lens 28 in the sub scanning direction relative to the image height will increase, and the spot diameter of the light beam will change depending on the image height. However, as a result of configuring the R1 face as described above, changes in the spot diameter can be inhibited. Moreover, in the oblique incident optical system, a positional variation of the deflective surface 26R of the polygon mirror 26 in the optical axis direction will arise during the deflection/scanning process, and this will affect the imaging performance. However, as a result of configuring the R2 face, in which the distance from the deflective surface 26R is farther than the R1 face, as described above, the positional variation of the deflective surface 26R can be favorably corrected. In addition, with both the R1 face and the R2 face, since the symbol of the curvature in the sub scanning direction cross section will not be inverted, there is also an advantage in that the die workability is also favorable.

As described above, according to the present disclosure, it is possible to provide an optical scanning device having a scanning lens in which the die machining thereof is easy and which yields superior optical performance, as well as an image forming apparatus.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

The invention claimed is:
1. An optical scanning device, comprising:
a light source which emits a light beam;
a deflector including a deflective surface which reflects and then deflects/scans the light beam emitted from the light source;
an incident optical system which causes the light beam emitted from the light source to enter the deflector from an oblique direction; and
one scanning lens which includes a first face facing the deflector and a second face on an opposite side to the first face, and performs imaging of the light beam deflected/scanned on a surface to be scanned, wherein
in a main scanning direction cross section of the scanning lens, when a scanning range is separated, with on axis as a reference, into an image height region of a first direction and an image height region of a second direction that is opposite to the first direction, the incident optical system is disposed on a side of the image height region of the first direction,
curvature of the first face in a sub scanning direction cross section decreases from on axis toward off axis in a main scanning direction, and
curvature of the second face in the sub scanning direction cross section gradually increases from the end part of off axis in the first direction of the scanning range to the image height region of axis in the second direction in the main scanning direction.

2. The optical scanning device according to claim 1, wherein
the curvature of the second face in the sub scanning direction cross section has an extreme value in the image height region of off axis in the second direction.

3. The optical scanning device according to claim 1, wherein
the curvature of the first face is set to satisfy the following formula:

$$0 \leq R\_{1i} \leq R\_{1C} \times \left(\frac{1}{A_i} + \frac{1}{B_i}\right) / \left(\frac{1}{A_C} + \frac{1}{B_C}\right)$$

where $R\_{1i}$ is the curvature of the first face in the sub scanning direction cross section of an arbitrary image height in the main scanning direction;

$R\_{1C}$ is the curvature of the first face in the sub scanning direction cross section on axis in the main scanning direction;

Ai is a distance from the deflective surface to a principal point of the scanning lens on a side of the deflective surface in the sub scanning direction, of an arbitrary image height;

Bi is a distance from a principal point of the scanning lens on a side of the surface to be scanned in the sub scanning direction to the surface to be scanned, of an arbitrary image height;

Ac is a distance on axis from the deflective surface to a principal point of the scanning lens on a side of the deflective surface in the sub scanning direction; and Bc is a distance on axis from a principal point of the scanning lens on a side of the surface to be scanned in the sub scanning direction to the surface to be scanned.

4. The optical scanning device according to claim 1, wherein
the deflector is a polygon mirror in which a rotating axis is mounted at a center of the polygonal mirror, the polygonal mirror being used as the deflective surface.

5. An image forming apparatus, comprising:
an image carrier which carries an electrostatic latent image; and
an optical scanning device which irradiates a light beam, with a peripheral surface of the image carrier being used as a surface to be scanned, wherein
the optical scanning device includes:
a light source which emits a light beam;
a deflector including a deflective surface which reflects and then deflects/scans the light beam emitted from the light source;
an incident optical system which causes the light beam emitted from the light source to enter the deflector from an oblique direction; and
one scanning lens which includes a first face facing the deflector and a second face on an opposite side to the first face, and performs imaging of the light beam deflected/scanned on the surface to be scanned, wherein
in a main scanning direction cross section of the scanning lens, when a scanning range is separated, with on axis as a reference, into an image height region of a first direction and an image height region of a second direction that is opposite to the first direction, the incident optical system is disposed on a side of the image height region of the first direction,
curvature of the first face in a sub scanning direction cross section decreases from on axis toward off axis in a main scanning direction, and
curvature of the second face in the sub scanning direction cross section gradually increases from the part of off axis in the first direction of the scanning range to the image height region of axis in the second direction in the main scanning direction.

6. The image forming apparatus according to claim 5, wherein
the curvature of the second face in the sub scanning direction cross section has an extreme value in the image height region of off axis in the second direction.

7. The image forming apparatus according to claim 5, wherein
the curvature of the first face is set to satisfy the following formula:

$$0 \le R\_{1i} \le R\_{1C} \times \left(\frac{1}{A_i} + \frac{1}{B_i}\right) \Big/ \left(\frac{1}{A_C} + \frac{1}{B_C}\right)$$

where $R\_{1i}$ is the curvature of the first face in the sub scanning direction cross section of an arbitrary image height in the main scanning direction;

$R\_{1C}$ is the curvature of the first face in the sub scanning direction cross section on axis in the main scanning direction;

Ai is a distance from the deflective surface to a principal point of the scanning lens on a side of the deflective surface in the sub scanning direction, of an arbitrary image height;

Bi is a distance from a principal point of the scanning lens on a side of the surface to be scanned in the sub scanning direction to the surface to be scanned, of an arbitrary image height;

Ac is a distance on axis from the deflective surface to a principal point of the scanning lens on a side of the deflective surface in the sub scanning direction; and Bc is a distance on axis from a principal point of the scanning lens on a side of the surface to be scanned in the sub scanning direction to the surface to be scanned.

8. The image forming apparatus according to claim 5, wherein
the deflector is a polygon mirror in which a rotating axis is mounted at a center of the polygonal mirror, the polygonal mirror being used as the deflective surface.

* * * * *